United States Patent

Duda

(10) Patent No.: US 10,341,218 B2
(45) Date of Patent: Jul. 2, 2019

(54) FORWARDING INFORMATION BASE ENTRY PRIORITY

(71) Applicant: Arista Networks, Inc., Santa Clara, CA (US)

(72) Inventor: Kenneth James Duda, Santa Clara, CA (US)

(73) Assignee: Arista Networks, Inc., Santa Clara, CA (US)

(*) Notice: Subject to any disclaimer, the term of this patent is extended or adjusted under 35 U.S.C. 154(b) by 289 days.

(21) Appl. No.: 15/056,334

(22) Filed: Feb. 29, 2016

(65) Prior Publication Data

US 2017/0250893 A1 Aug. 31, 2017

(51) Int. Cl.
*H04L 12/751* (2013.01)

(52) U.S. Cl.
CPC .................................. *H04L 45/02* (2013.01)

(58) Field of Classification Search
CPC ................................................... H04L 12/751
See application file for complete search history.

(56) References Cited

U.S. PATENT DOCUMENTS

| 2012/0294166 | A1 | 11/2012 | Punati et al. |
| 2014/0013324 | A1* | 1/2014 | Zhang ............... H04L 49/70 718/1 |
| 2014/0119379 | A1* | 5/2014 | Liang ................ H04L 12/4625 370/401 |
| 2014/0254605 | A1 | 9/2014 | Arumala et al. |
| 2014/0369209 | A1 | 12/2014 | Khurshid et al. |
| 2015/0117459 | A1* | 4/2015 | Liu ..................... H04L 45/742 370/392 |
| 2015/0117495 | A1 | 4/2015 | Tiruvuru et al. |

* cited by examiner

*Primary Examiner* — Sulaiman Nooristany
(74) *Attorney, Agent, or Firm* — Chamberlain, Hrdlicka, White, Williams & Aughtry (57) ABSTRACT

In general, embodiments of the invention relate to a method of programming a data plane forwarding information base (FIB). The method includes obtaining, by a FIB entry optimizer in a control plane, a new entry to be loaded into the data plane FIB, making a first determination, by the FIB entry optimizer, that the data plane FIB is not full; and based on the first determination: loading, by the FIB entry optimizer, the new entry into the data plane FIB.

20 Claims, 8 Drawing Sheets

FORWARDING INFORMATION BASE ENTRY PRIORITY

BACKGROUND

A network may include a number of network infrastructure components. The network infrastructure components may communicate with each other by Internet protocol. Each network infrastructure component may forward packets to enable network infrastructure components to communicate that do not have a direct connection.

SUMMARY

In one aspect, a method of programming a data plane forwarding information base in accordance with one or more embodiments of the invention may include obtaining, by a FIB entry optimizer in a control plane, a new entry to be loaded into the data plane FIB; making a first determination, by the FIB entry optimizer, that the data plane FIB is not full; and, based on the first determination, loading, by the FIB entry optimizer, the new entry into the data plane FIB.

In one aspect, a method of programming a data plane forwarding information base in accordance with one or more embodiments of the invention may include obtaining, by the FIB entry optimizer, a new entry to be loaded into the data plane FIB; making a first determination, by the FIB entry optimizer, that the data plane FIB is full; identifying, by the FIB entry optimizer, a lowest priority of any entry of the data plane FIB; making a second determination, by the FIB entry optimizer, that the new entry has a priority lower than the lowest priority; and making a third determination, by the FIB entry optimizer, that the new entry is not to be loaded into the data plane FIB based on the second determination.

In one aspect, a method of programming a data plane forwarding information base in accordance with one or more embodiments of the invention may include making a first determination, by the FIB entry optimizer, that a to-be-unloaded entry is in the data plane FIB; making a second determination, by the FIB entry optimizer, that the data plane FIB is full; in response to the first and second determination: identifying, by the FIB entry optimizer, at least one entry of a control plane FIB having the highest priority that is not in the data plane FIB; unloading, by the FIB entry optimizer, the to-be-unloaded entry from the data plane FIB; and loading, by the FIB entry optimizer, an entry of the at least one entry of a control plane FIB having the highest priority that is not in the data plane FIB into the data plane FIB.

In one aspect, a method of programming a data plane forwarding information base in accordance with one or more embodiments of the invention may include obtaining, by a FIB entry optimizer in a control plane, a change to a priority of an entry of a control plane FIB; making a first determination, by the FIB entry optimizer, that the entry of the control plane FIB is in the data plane FIB; identifying, by the FIB entry optimizer, a highest priority of any entry of the control plane FIB that is not in the data plane FIB; making a second determination, by the FIB entry optimizer, that the change to the priority of the entry of the control plane FIB changed the priority to a value lower than the highest priority; unloading, by the FIB entry optimizer, the entry of the control plane FIB from the data plane FIB; and loading, by the FIB entry optimizer, the entry of the control plane FIB having the highest priority of any entry of the control plane FIB that is not in the data plane FIB.

In one aspect, a network device in accordance with one or more embodiments of the invention may include a control plane, including: a routing information base comprising a first plurality of entries; a control plane forwarding information (FIB) base including a second plurality of entries; a FIB entry optimizer programmed to program a third plurality of entries of a data plane FIB using, at least in part, the second plurality of entries; a data plane, including: a data plane FIB including the third plurality of entries; and a network processor programmed to forward packets based on the third plurality of entries, the third plurality of entries is less than the second plurality of entries.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to a method and system for network communication. More specifically, one or more embodiments of the invention may relate to programming a forwarding information base (FIB) operating in a data plane of the network device. The data plane FIB may be special purpose hardware that includes information used by a network processor of the network device to forward packets received by the network device.

In one or more embodiments of the invention, the network device includes a FIB entry optimizer that programs entries of the data plane FIB based on a control plane FIB. The control plane FIB may include one or more entries. Each of the entries may include a route prefix, a next-hop information, and priority. The FIB entry optimizer may program entries of the data plane FIB based on changes to the control plane FIB. The changes may include additions of entries, removal of entries, and/or changes the priority of entries.

Figure 1:
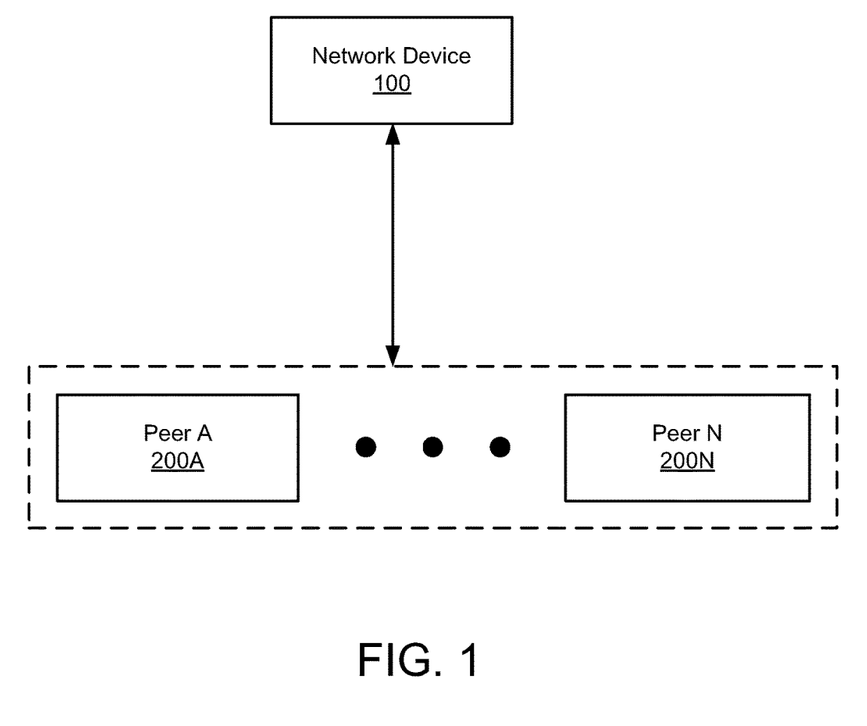
FIG. 1 shows a system in accordance with one or more embodiments of the invention.

FIG. 1 shows a system in accordance with one or more embodiments of the invention. The system shown in FIG. 1 may be used, for example, to perform network communications. The system includes one or more network devices (100) and one or more peers (200A-200N). Each of these components is described below.

In one embodiment of the invention, a peer (200A-200N) may be a network infrastructure component. A peer (200A-200N) may be, for example, a router, switch, server, or other device that supports network communications. Each peer (200A-200N) may be programmed to transmit and/or receive packets in accordance with one or more networking protocols. In one embodiment of the invention, a peer (200A-200N) may be operatively connected (directly or indirectly via a wired and/or wireless connection(s)) to the network device (100) and zero, one, or more other peers (200A-200N).

Figure 2:
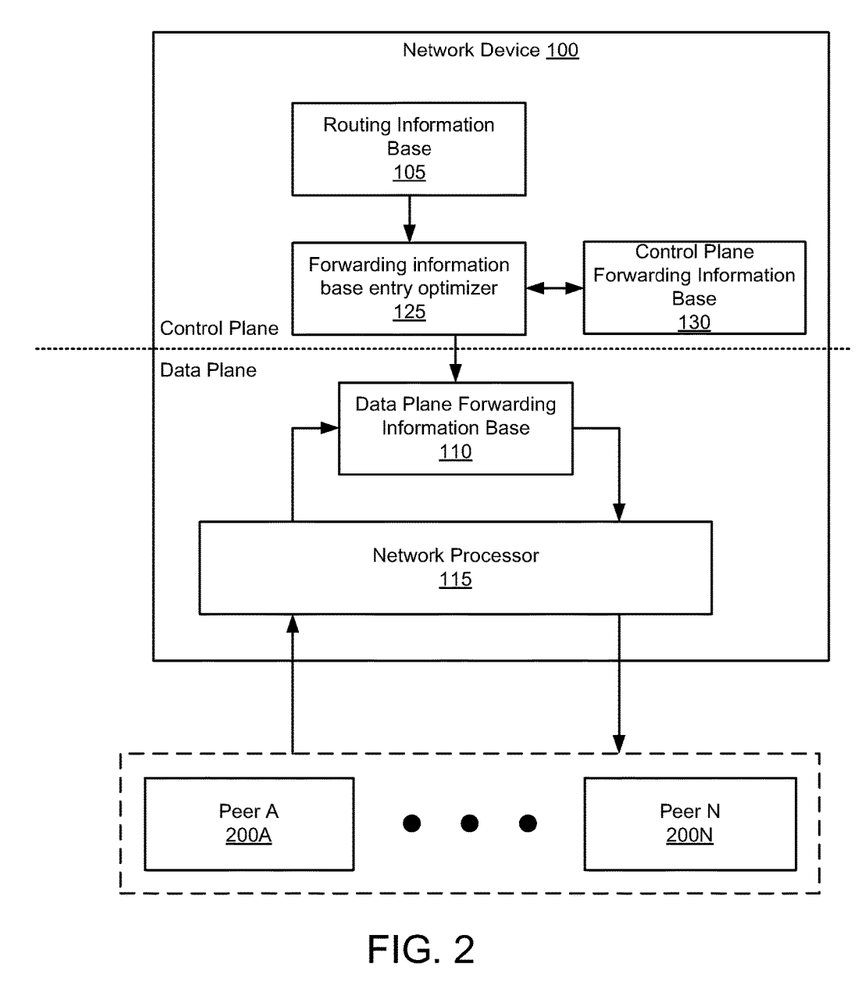
FIG. 2 shows network device in accordance with one or more embodiments of the invention.

In one or more embodiments of the invention, the network device (100) is a physical device. FIG. 2 shows a network device (100) in accordance with one or more embodiments of the invention. The network device (100) may be, for example, a router, switch, a multi-layer switch, server, or other device that supports network communications. The network device (100) may be programmed to implement one or more network communication protocols. More specifically, the network device (100) may be programmed to forward packets based on information included in a data plane FIB of the network device.

In one or more embodiments of the invention, the network device (100) includes non-transitory storage, memory (e.g. Random Access Memory), and one or more processors. An operating system may be stored on the non-transitory storage and executed by the one or more processors in the network device. The operating system may manage the operation of the network device (100). The non-transitory storage may also include instructions, which when executed by the one or more processors enable the network devices to perform the functions described below and shown in FIGS. 6-8.

The network device (100) may also include a routing information base (105), a data plane Forwarding Information Base (FIB) (110), a control plane FIB (130), a FIB entry optimizer (125), and a network processor (115). Each of the components is described below.

The network device (100) may include a network processor (115) connected to at least one peer (200A-200N) by an operative connection. The network processor (115) may be a physical device programmed to send and/or receive packets to and/or from a network based on information contained in the data plane FIB (110). The network processor (100) may be, for example, a discrete processor, digital signal processor, application specific integrated circuit, field programmable gate array, microcontroller, or any other type of circuitry programmed to send and receive packets.

The network device (100) may include a RIB (105). The RIB (105) may be a data structure that includes information related to the topology of a network. The RIB (105) may be stored on the network device.

For example, the RIB may store routes to destinations in a network that are accessible via the network device. The RIB may be continuously or periodically updated by the network device (100) or an external source such as a network controller (not shown) as the topology of a network changes. The RIB may also include a priority for each route in the RIB. The priority may be, for example, a numerical value proportional to the importance of the route. The priority of each route may rank the relative importance of each route of the RIB. The priority information may be set by, for example, a user of the network device such as a network administrator or by the network controller. In one or more embodiments of the invention, the RIB may operate in a control plane of the network device.

Figure 3A:
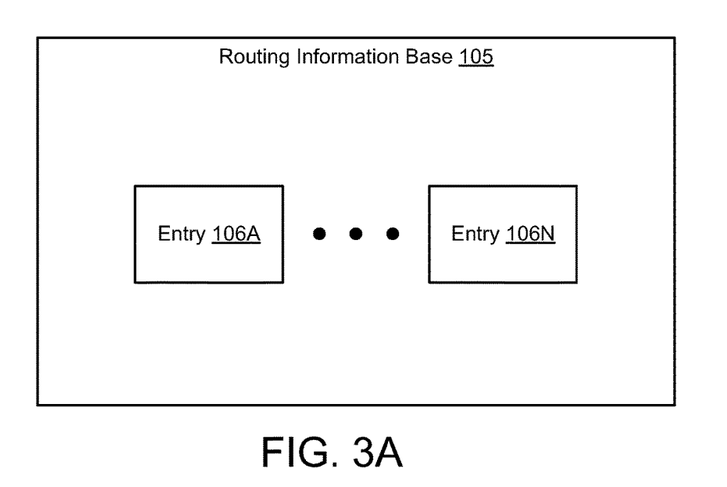
FIG. 3A shows a Routing Information Base (RIB) in accordance with one or more embodiments of the invention.
Figure 3B:
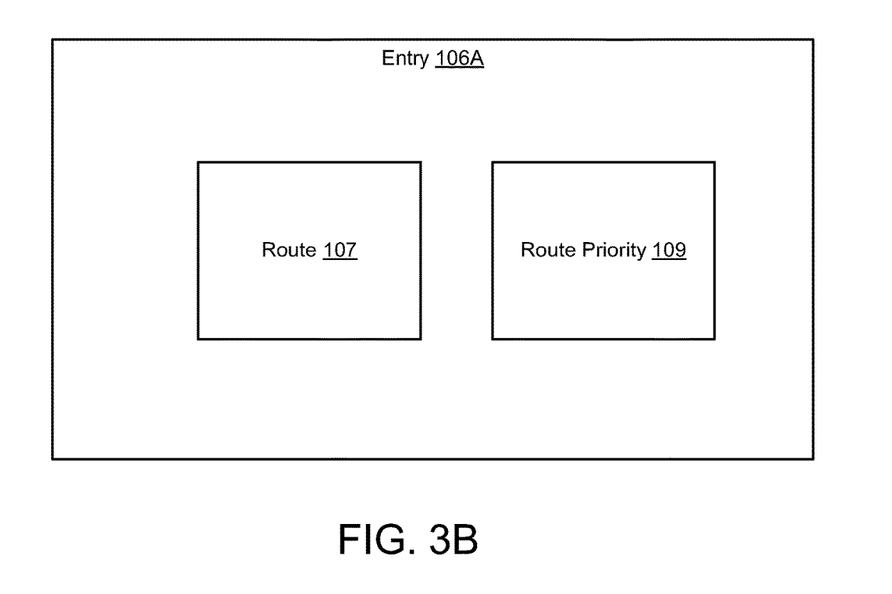
FIG. 3B shows an entry of the RIB in accordance with one or more embodiments of the invention.

FIG. 3A shows an example of a RIB (105) in accordance with one or more embodiments of the invention. The RIB (105) includes a number of entries (106A-106N). Each entry (106A-106N) may correspond to a route that is accessible via the network device. FIG. 3B shows an example of an entry (106A) of the example of a RIB (105). The entry (106A) includes a route (107) and a priority (109) of the route (107). The route may include, for example, an IP address, a net mask, and a nexthop. For example, the route may be 192.168.0.0, the netmask may be 255.255.255.0, and the nexthop may be 192.168.1.100.

Returning to FIG. 2, while the RIB may include all of the necessary information to forward a packet, e.g., the routes, it is computationally costly to determine packet forwarding by a RIB. To reduce the computational cost of forwarding a packet, the network device may include a control plane FIB (130) and a data plane FIB (110).

In one embodiment of the invention, the control plane FIB (130) is a data structure that includes information to resolve the next-hop of any to-be-forwarded packet and a priority. More specifically, each entry of the control plane FIB (130) may include information to identify the next-hop of a received packet. The network device (100) may be programmed to program the control plane FIB (130) based on the RIB (105).

Figure 4A:
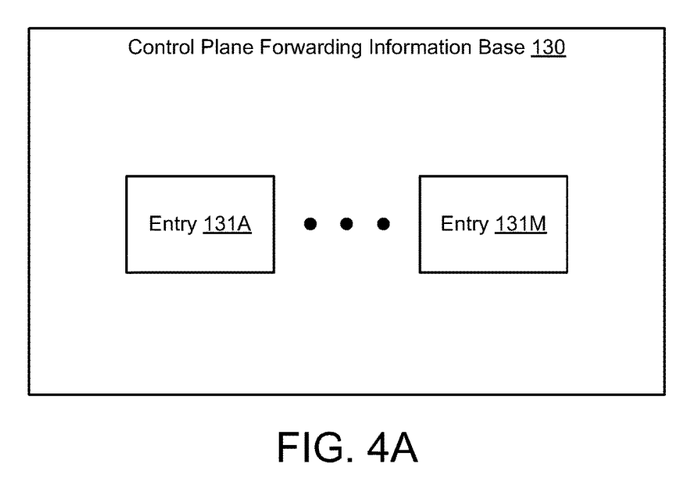
FIG. 4A shows a control plane Forwarding Information Base (FIB) in accordance with one or more embodiments of the invention.
Figure 4B:
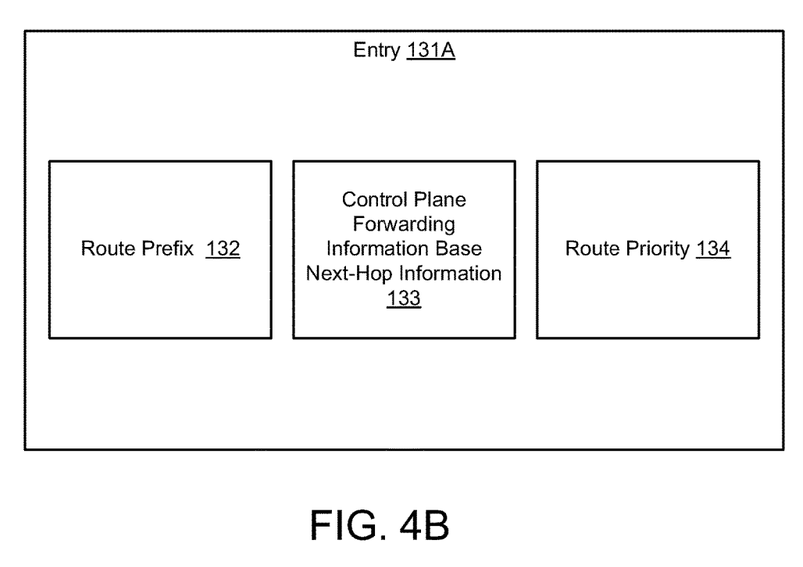
FIG. 4B shows an entry of the control plane FIB in accordance with one or more embodiments of the invention.

FIG. 4A shows a control plane FIB (130) in accordance with one or more embodiments of the invention. The control plane FIB (130) includes a number of entries (131A-131N). Each entry (131A-131N) may correspond to a route of the RIB (105). However, not all entries in the RIB have a corresponding entry in the control plane FIB. Said another way, there may not be a 1:1 correspondence between the entries in the RIB and entries in the data plane FIB. FIG. 4B shows an example of an entry (131A) of the control plane FIB (130). The entry (131A) includes a route prefix (132), control plane FIB next-hop information (133), and priority (134) of a route of the RIB (105) associated with the entry (131A) of the control plane FIB (130). The route prefix (132), control plane FIB next-hop information (133), and priority (134) may be derived from an entry of the RIB (105) associated route of the entry (131A) of the control plane FIB (130). For example, the route prefix (132) may be derived from the route (107) stored in the RIB (105), the control plane FIB next-hop information (133) may be derived from the route (107) stored in the RIB (105), and the priority (134) may be the same as the priority (109) stored in the RIB (105).

Returning to FIG. 2, to improve the rate of packet forwarding, the network device may include a data plane FIB (110). The data plane FIB (110) may operate on special purpose hardware of the network device. The data plane FIB (110) may be smaller than the control plane FIB (130) and include only a portion of the information included in the control plane FIB (130). By operating the data plane FIB (110) in the data plane, the computational cost of performing packet forwarding may be reduced when compared to performing packet forwarding by the control plane FIB (130) or the RIB (105) operating in the control plane.

Figure 5A:
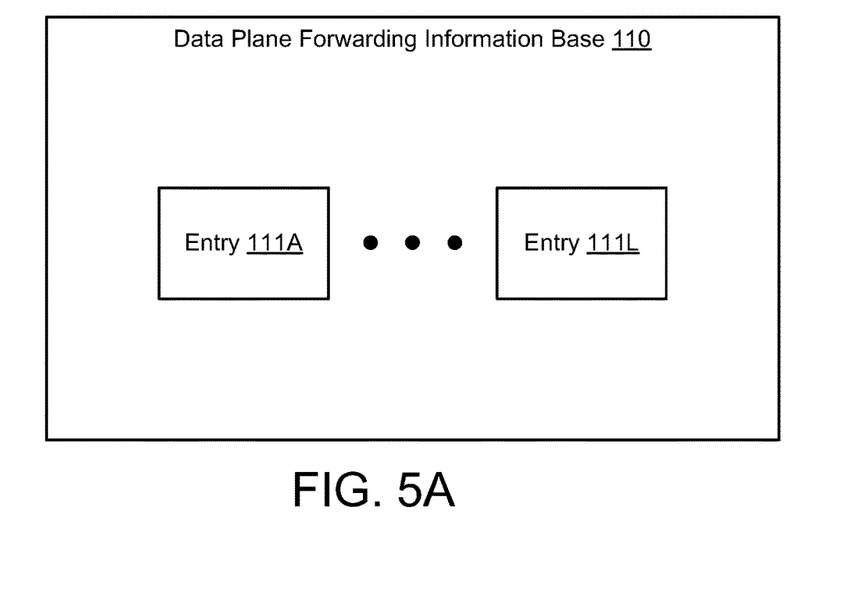
FIG. 5A shows a data plane FIB in accordance with one or more embodiments of the invention.

FIG. 5A shows an example of a data plane FIB (110) in accordance with one or more embodiments of the invention. The data plane FIB (110) includes a number of entries (11A-111L). Each entry (111A-111L) may correspond to an entry of the control plane FIB (130). FIG. 4B shows an example of an entry (111A) of the data plane FIB (110). The entry (111A) includes a route prefix (112) and a data plane FIB next-hop information (113) associated with an entry of the control plane FIB (130). The route prefix (112) and data plane FIB next-hop information (113) may be derived from the entry of the control plane FIB (130) associated with entry of the data plane FIB (110). For example, the route prefix (112) may be the same as the route prefix (132) stored in the control plane FIB (130) and the data plane FIB next-hop information (113) may be derived from the control plane FIB next-hop information (113) stored in the control plane FIB (130). In one embodiment of the invention, the control plane FIB-next hop information may specify the egress port on the network device (not shown). The number of entries (111A-111L) in the data plane FIB (110) may be smaller than the number of entries (131A-131N, FIG. 4A) in the control plane FIB (130, FIG. 4A).

In one embodiment of the invention, the control plane FIB (or another data structure) tracks which of the control plane FIB entries have a corresponding entry in the data plane FIB.

Returning to FIG. 2, the data plane FIB (110) may be programmed by the FIB entry optimizer (125). The FIB entry optimizer (125) may be executing on the network device (100) as shown in FIG. 2 or may be executing on a device that is external to the network device (100) without departing from the invention.

Figure 6:
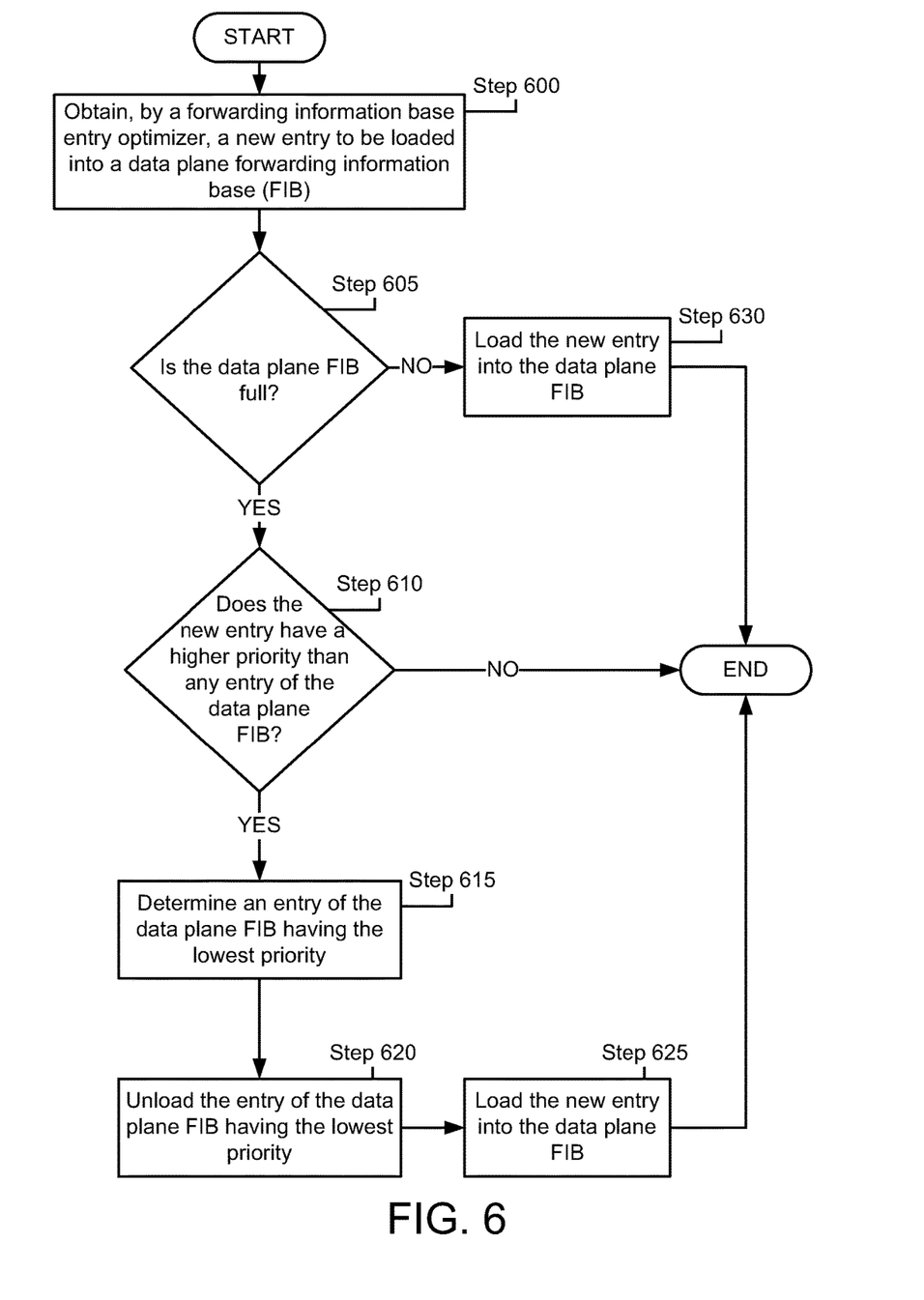
FIG. 6 shows a method of programming a data plane FIB in accordance with one or more embodiments of the invention.
Figure 7:
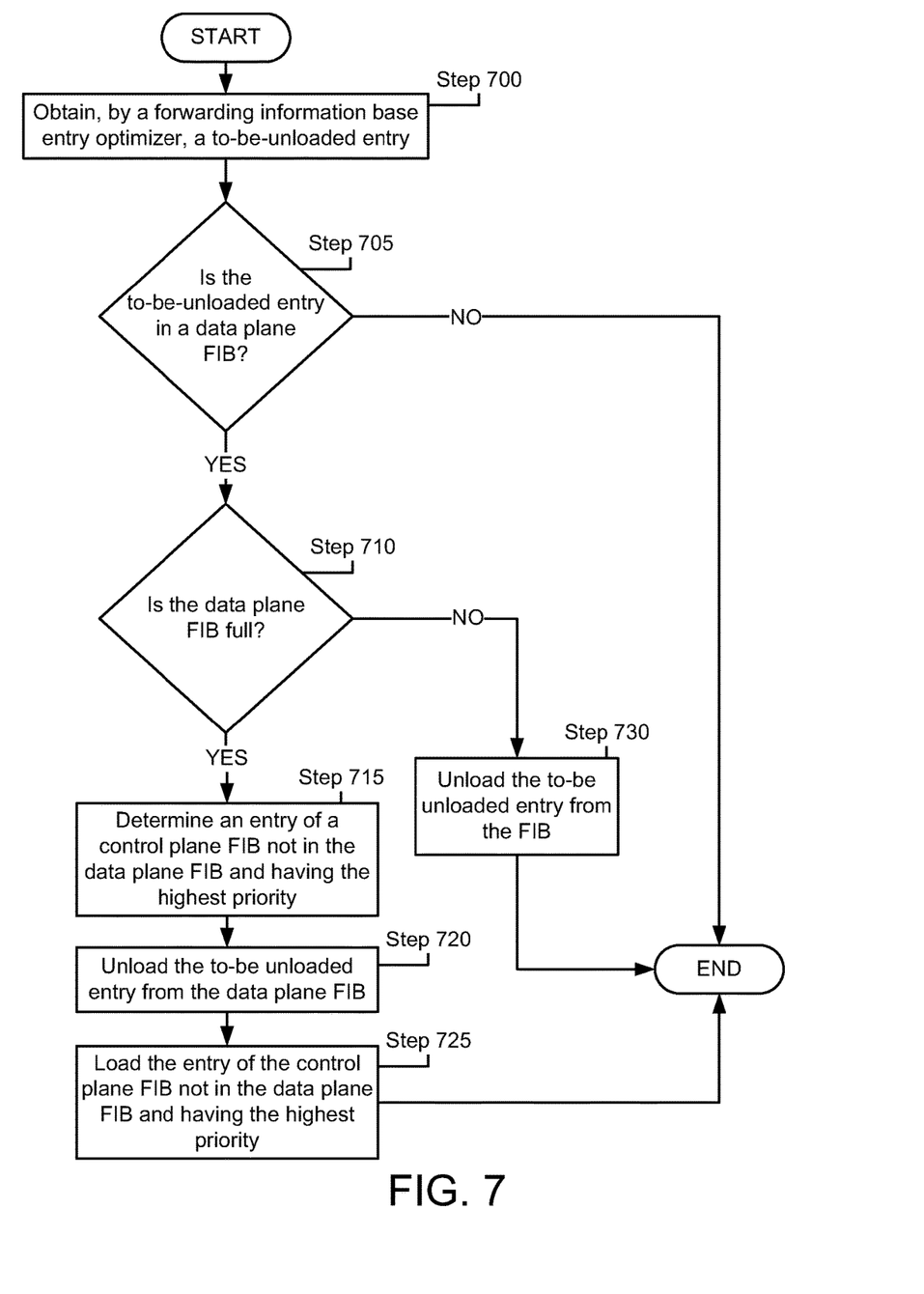
FIG. 7 shows a method of programming a data plane FIB in accordance with one or more embodiments of the invention.
Figure 8:
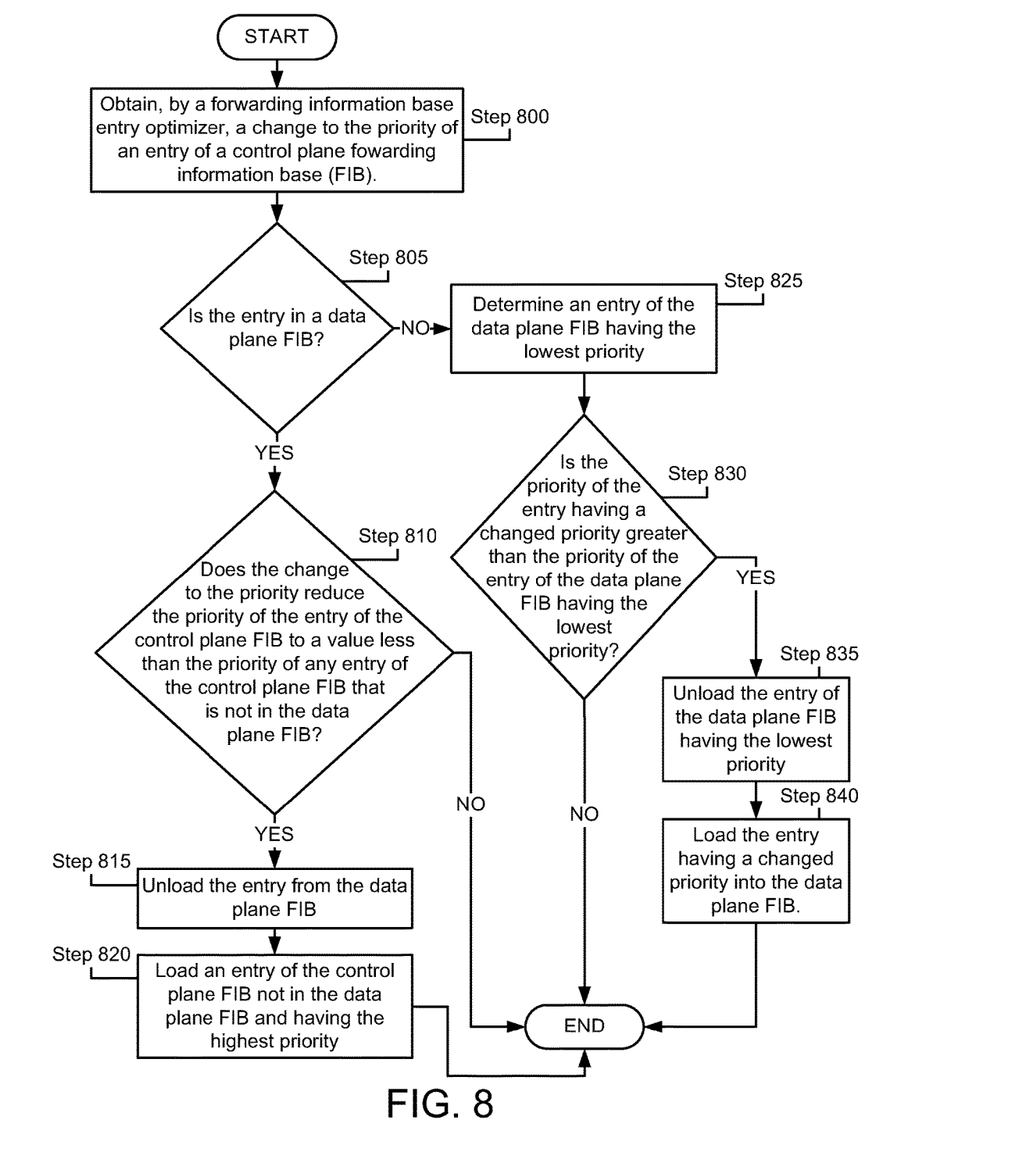
FIG. 8 shows a method of programming a data plane FIB in accordance with one or more embodiments of the invention.

The FIB entry optimizer (125) may be programmed to program entries of the data plane FIB (110). More specifically, the FIB entry optimizer (125) may be programmed to generate, modify, and/or delete entries of the data plane FIB (110) based on changes to the control plane FIB (130). The FIB entry optimizer (125) may include functionality to implement the methods of programming a FIB as shown in FIGS. 6, 7, and 8. The methods may include programming or deprogramming entries of the data plane FIB (130) based on the priority of the entries and/or programming or deprogramming entries of the data plane FIB (110) based on changes to the priority of the entries of the control plane FIB (130).

Those skilled in the art will appreciate that the invention is not limited to the architecture shown in FIGS. 1-5B.

In the following flowcharts and action diagrams, functionality of components of the system shown in FIGS. 1-5B will be described. The functionality shown in the following figures may enable, for example, a data plane FIB to be programmed. FIGS. 6-8 show flowcharts of methods that may be performed, for example, by a network device.

FIG. 6 shows a flowchart according to one or more embodiments of the invention.

The method depicted in FIG. 6 may be used to program a data plane FIB in accordance with one or more embodiments of the invention. One or more steps shown in FIG. 6 may be omitted, repeated, and/or performed in a different order among different embodiments.

In Step 600, a FIB entry optimizer obtains a new entry to be programmed into a data plane FIB of a network device. The FIB entry optimizer may be a component of the network device as illustrated in FIG. 2.

In one or more embodiments of the invention, the new entry may be obtained by the FIB entry optimizer from a control plane FIB of the network device. The FIB entry optimizer may obtain an entry in response to a change in the control plane FIB, e.g., a new entry is added to the control plane FIB.

Continuing with the discussion of FIG. 6, in Step 605, the FIB entry optimizer determines whether the data plane FIB is full (i.e., no additional entries may be stored in the data plan FIB). The FIB entry optimizer may compare the number of entries in the data plane FIB with a maximum number of entries of the data plane FIB to determine if the data plane FIB is full.

If the data plane FIB is full, the method proceeds to Step 610. If the data plane FIB is not full, the method proceeds to Step 630.

In Step 610, the FIB entry optimizer determines whether the new entry has a higher priority than any entry of the data plane FIB. As discussed with respect to FIGS. 4A-4B and 5A-5B, each entry of the control plane FIB may include a route priority and each entry of the data plane FIB may be associated with an entry of the control plane FIB. The FIB entry optimizer may determine the route priority of each entry of the data plane FIB based on the priority of the entry of the control plane FIB associated with the data plane FIB entry. The FIB entry optimizer may compare the route priority of the new entry to the priority of the entries stored in data plane FIB. This comparison may be performed by: (i) determining from the control plane FIB (or another data structure), which entries are in the data plane FIB; and (ii) based on the identified entries in the control plane FIB in (i) determining a priority associated with each of these entries using the RIB.

If the new entry has a priority higher than any entry of the data plane FIB, the method proceeds to Step 615. If the new entry does not have a priority higher than any entry of the data plane FIB, the method may end after Step 610.

In Step 615, the FIB entry optimizer determines the entry of the data plane FIB that has the lowest priority. The FIB entry optimizer may sequentially compare each priority of each entry of the data plane FIB to determine the entry having the lowest priority. As discussed above, the control plane FIB (or another data structure) may track which of the control plane FIB entries are in the data plane FIB. Accordingly, the determination in step 615 may be performed by analyzing the appropriate/corresponding entries in the control plane FIB.

In Step 620, the FIB entry optimizer unloads the entry of the data plane FIB having the lowest priority identified in Step 615 from the data plane FIB. The FIB entry optimizer may unload the entry from the data plane FIB by deleting the entry.

Figure 5B:
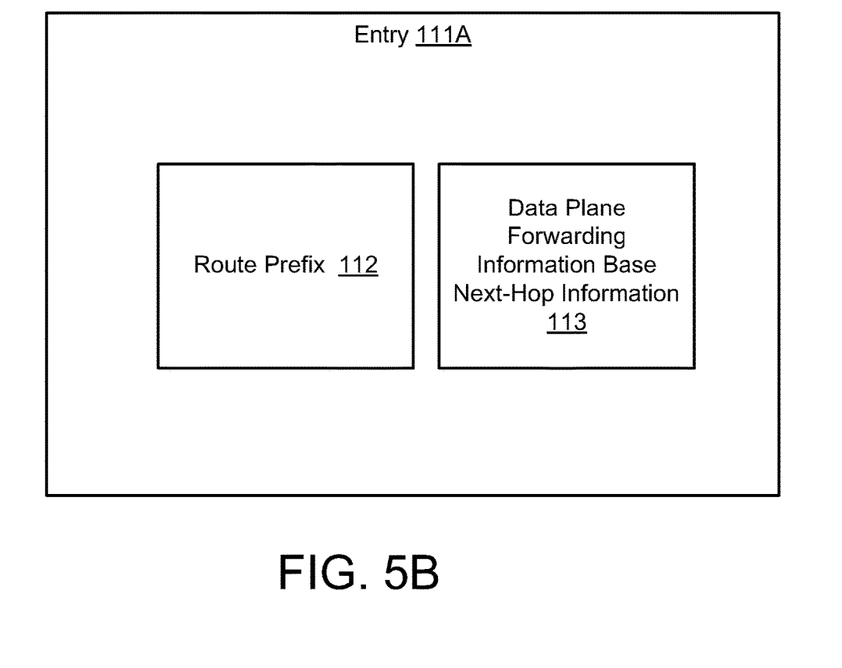
FIG. 5B shows an entry of the control plane FIB in accordance with one or more embodiments of the invention.

In Step 625, the FIB entry optimizer loads the new entry obtained in Step 600 into the data plane FIB. The FIB entry optimizer may load the new entry into the data plane FIB by (i) generating an entry of the data plane FIB having a route prefix and next-hop information derived from the new entry obtained in Step 600 and (ii) subsequently storing the new data plane FIB entry in the data plane FIB. The generated entry of the data plane FIB may have a structure as illustrated in FIG. 5B. The method may end after Step 625.

Returning to the discussion of FIG. 6, as noted in Step 605, the method may proceed to Step 630 if the data plane FIB is full. In Step 630, the FIB entry optimizer loads the new entry into the data plane FIB. The FIB entry optimizer may load the new entry into the data plane FIB by generating an entry of the data plane FIB having a route prefix and next-hop information derived from the new entry obtained in Step 600 and then subsequently loading the entry into the data plane FIB. The generated entry of the data plane FIB may have a structure as illustrated in FIG. 5B. The method may end after Step 630.

The process of programming a data plane FIB by the method shown in FIG. 6 is further described using an explanatory example. The following example is for explanatory purposes and is not intended to limit the scope of the technology.

EXAMPLE 1

A network device may include a data plane FIB including a first entry having a priority of 5, a second entry having a priority of 7, and a third entry having a priority of 3. The data plane FIB may have a maximum number of entries of 4.

The network device may obtain a new entry including a priority of 2 to be loaded into the data plane FIB. More specifically, a control plane FIB may receive a new entry by the network device. In response to the control plane FIB receiving the new entry, a FIB entry optimizer of the network device may obtain the new entry from the control plane FIB.

In response to obtaining the new entry, the FIB entry optimizer may determine whether the data plane FIB is full by comparing the number of entries of the data plane FIB to the maximum number of entries. In this case, the FIB entry optimizer may determine the data plane FIB is not full because the number of entries of the data plane FIB is less than the maximum number of entries, e.g., the data plane FIB includes 3 entries out of a maximum number of entries of 4.

In response to determining the data plane FIB is not full, the FIB entry optimizer may load the new entry into the data plane FIB by generating an entry of the data plane FIB including a route prefix and next-hop information. In this example, the generated entry is the fourth entry of the data plane FIB. The route prefix and next-hop information of the generated fourth entry may be based on a route prefix and next-hop information of the new entry obtained from the control plane FIB.

The network device may obtain a second new entry including a priority of 4 to be loaded into the data plane FIB. More specifically, a control plane FIB may receive a second new entry by the network device. In response to the control plane FIB receiving the second new entry, a FIB entry optimizer of the network device may obtain the second new entry from the control plane FIB.

In response to obtaining the second new entry, the FIB entry optimizer may determine whether the data plane FIB is full by compare the number of entries of the data plane FIB to the maximum number of entries. In this case, the FIB entry optimizer may determine the data plane FIB is full because the number of entries of the data plane FIB is not less than the maximum number of entries, e.g., the data plane FIB includes 4 entries out of a maximum number of entries of 4.

In response to determining the data plane FIB is full, the FIB entry optimizer may determine whether the second new entry has a higher priority than any entry of the data plane FIB. In this example, the second new entry has a priority of 4 which is greater than the priority of 3 of the third entry of the data plane FIB.

In response to determining that the second new entry has a higher priority than the third entry of the data plane FIB, the FIB entry optimizer may determine an entry of the data plane FIB having the lowest priority. The FIB entry optimizer may make the determination by comparing a priority of each entry of the data plane FIB based on the priority of each entry of the control plane FIB associated with each entry of the data plane FIB. In this example, the FIB entry optimizer may determine the third entry of the data plane FIB has the lowest priority.

In response to determining the third entry of the data plane FIB has the lowest priority, the FIB entry optimizer may unload the third entry of the data plane FIB. The FIB entry optimizer may unload the third entry by deleting the third entry having the lowest priority from the data plane FIB.

In response to unloading the third entry of the data plane FIB, the FIB entry optimizer may load the new entry into the data plane FIB by generating the fifth entry of the data plane FIB including a route prefix and next-hop information. The route prefix and next-hop information of the generated fifth entry may be based on a route prefix and next-hop information of the new entry obtained from the control plane FIB.

The network device may obtain a third new entry including a priority of 1 to be loaded into the data plane FIB.

In response to obtaining the third new entry, the FIB entry optimizer may determine whether the data plane FIB is full by compare the number of entries of the data plane FIB to the maximum number of entries. In this case, the FIB entry optimizer may determine the data plane FIB is full because the number of entries of the data plane FIB is not less than the maximum number of entries, e.g., the data plane FIB includes 4 entries out of a maximum number of entries of 4.

In response to determining the data plane FIB is full, the FIB entry optimizer may determine whether the third new entry has a higher priority than any entry of the data plane FIB. In this example, the third new entry has a priority of 1 which is less than the priority of each entry of the data plane FIB, e.g., priories 2, 3, 5, and 7.

Thus, in Example 1, the FIB entry optimizer may program the data plane FIB based on the priority of entries of the data plane FIB, a priority of an obtained entry, and the whether the data plane FIB is full.

FIG. 7 shows a flowchart according to one or more embodiments of the invention. The method depicted in FIG. 7 may be used to program a data plane FIB in accordance with one or more embodiments of the invention. One or more steps shown in FIG. 7 may be omitted, repeated, and/or performed in a different order among different embodiments.

In Step 700, a FIB entry optimizer obtains a to-be-unloaded entry that is to be unloaded from a data plane FIB of a network device. The FIB entry optimizer may be a component of the network device as illustrated in FIG. 2.

In one or more embodiments of the invention, the to-be-unloaded entry may be obtained by the FIB entry optimizer from a control plane FIB of the network device. The FIB entry optimizer may obtain an entry in response to a change in the control plane FIB, e.g., an entry is removed to the control plane FIB. The to-be-unloaded entry may have a structure as shown in FIG. 4B and include, at least in part, a route prefix, next-hop information, and/or a route priority.

Continuing with the discussion of FIG. 7, in Step 705, the FIB entry optimizer determines whether the to-be-unloaded entry is in the data plane FIB. As described with respect to FIGS. 4 and 5, each entry of the data plane FIB may be associated with an entry of the control plane FIB. If no association between the to-be-unloaded entry and an entry of the data plane FIB, the FIB entry optimizer may determine the to-be-unloaded entry is not in the data plane FIB.

If the to-be-unloaded entry is in the data plane FIB, the method proceeds to Step 710. If the to-be-unloaded is not in the data plane FIB, the method may end.

In Step 710, the FIB entry optimizer determines whether the data plane FIB is full in response to determining whether the to-be-unloaded entry is in the data plane FIB. The data plane FIB may only store a limited number of entries. The FIB entry optimizer may compare the number of entries in the data plane FIB with a maximum number of entries of the data plane FIB to determine if the data plane FIB is full.

If the data plane FIB is full, the method proceeds to Step 715. If the data plane FIB is not full, the method proceeds to Step 730.

In Step 715, the FIB entry optimizer determines an entry of the control plane FIB that has the highest priority and is not in the data plane FIB. The FIB entry optimizer may sequentially compare each priority of each entry of the control plane FIB not associated with an entry of the data plane FIB to determine the entry having the highest priority.

In Step 720, the FIB entry optimizer unloads the to-be-unloaded entry of the data plane FIB. The FIB entry optimizer may unload the to-be-unloaded entry from the data plane FIB by deleting the entry.

In Step 725, the FIB entry optimizer loads the entry of the control plane FIB that has the highest priority and is not in the data plane FIB determined in Step 725 into the data plane FIB. The FIB entry optimizer may load the entry of the control plane FIB that has the highest priority and is not in the data plane FIB into the data plane FIB by generating an entry of the data plane FIB having a route prefix and next-hop information derived from the entry of the control plane FIB that has the highest priority and is not in the data plane FIB determined in Step 720. The generated entry of the data plane FIB may have a structure as illustrated in FIG. 5B. The method may end after Step 725.

Returning to the discussion of FIG. 7, as noted in Step 710, the method may proceed to Step 730 if the data plane FIB is not full. In Step 730, the FIB entry optimizer unloads the to-be-unloaded entry from the data plane FIB in response to determining the data plane is not full. The FIB entry optimizer may unload the to-be-unloaded entry from the data plane FIB by deleting the entry from the data plane FIB.

The process of programming a data plane FIB by the method shown in FIG. 7 is further described using two explanatory examples. The following examples are for explanatory purposes and are not intended to limit the scope of the technology.

EXAMPLE 2

A network device may include a data plane FIB including a first entry having a first route prefix and a priority of 5, a second entry having a second route prefix and a priority of 7, and a third entry having a third route prefix and a priority of 3. The data plane FIB may have a maximum number of entries of 4.

The network device may obtain a to-be-unloaded entry including a fifth route prefix and a priority of 2. More specifically, an entry of the control plane FIB may be removed by the network device. In response to the entry being removed from the control plane FIB, the FIB entry optimizer of the network device may obtain the removed entry from the control plane FIB.

In response to obtaining the to-be-removed entry, the FIB entry optimizer may determine whether the to-be-unloaded entry is in the data plane FIB. In this case, the to-be-unloaded entry is not in the data plane FIB because the to-be-unloaded entry includes a fifth route prefix that does not match any route prefix of any entry of the data plane FIB.

The network device may obtain a second to-be-removed entry including a second route prefix. More specifically, a second entry of the control plane FIB may be removed by the network device. In response to the second entry being removed from the control plane FIB, the FIB entry optimizer of the network device may obtain the removed second entry from the control plane FIB as the second to-be-removed entry.

In response to obtaining the second to-be-removed entry, the FIB entry optimizer may determine whether the second to-be-unloaded entry is in the data plane FIB. In this case, the to-be-unloaded entry is in the data plane FIB because the second to-be-unloaded entry includes a second route prefix that matches the second route prefix of the second entry of the data plane FIB.

In response to determining the second to-be-unloaded entry is in the data plane FIB, the FIB entry optimizer may determine whether the data plane FIB is full. In this example, the FIB entry optimizer determines the data plane FIB is not full because the data plane FIB only includes 3 entries out of a maximum of four entries.

In response to determining the data plane FIB is not full, the FIB entry optimizer unloads the second to-be-unloaded entry from the data plane FIB. The FIB entry optimizer may unload the second to-be-unloaded entry from the data plane FIB by deleting the second to-be-unloaded entry from the data plane FIB.

EXAMPLE 3

A network device may include a data plane FIB including a first entry having a first route prefix and a priority of 5, a second entry having a second route prefix and a priority of 7, a third entry having a third route prefix and a priority of 3, and a fourth entry have a fourth route prefix and a priority of 4. The data plane FIB may have a maximum number of entries of 4.

The network device may also include control plane FIB having first entry having the first route prefix and a priority of 5, a second entry having a second route prefix and a priority of 7, a third entry having a third route prefix and a priority of 3, a fourth entry having a fourth route prefix and a priority of 4, and a fifth entry have a fifth route prefix and a priority of 2.

The network device may obtain a to-be-unloaded entry including the third route prefix and a priority of 3. More specifically, the second entry of the control plane FIB may be removed by the network device. In response to the second entry of the control plane FIB being removed, the FIB entry optimizer of the network device may obtain the second entry of the control plane FIB corresponding to the to-be-unloaded entry.

In response to obtaining the to-be-removed entry, the FIB entry optimizer may determine whether the to-be-unloaded entry is in the data plane FIB. In this case, the to-be-unloaded entry is in the data plane FIB because the to-be-unloaded entry includes a third route prefix that matches the route prefix of the third entry of the data plane FIB.

In response to determining the to-be-unloaded entry is in the data plane FIB, the FIB entry optimizer may determine whether the data plane FIB is full. In this example, the FIB entry optimizer determines the data plane FIB is full because the data plane FIB includes four entries out of a maximum of four entries.

In response to determining the data plane FIB is full, the FIB entry optimizer determines the fifth entry of the control plane FIB has the highest priority of any entry of the control plane FIB that is not in the data plane FIB.

In response to determining the fifth entry of the control plane FIB has the highest priority of any entry of the control plane FIB that is not in the data plane FIB, the FIB entry optimizer unloads the to-be-unloaded entry from the data plane FIB. The FIB entry optimizer may unload the to-be-unloaded entry from the data plane FIB by deleting the to-be-unloaded entry from the data plane FIB.

In response to unloading the to-be-unloaded entry from the data plane FIB, the FIB entry optimizer loads the fifth entry of the control plane FIB into the data plane FIB.

FIG. 8 shows a flowchart according to one or more embodiments of the invention. The method depicted in FIG. 8 may be used to program a data plane FIB in accordance with one or more embodiments of the invention. One or more steps shown in FIG. 8 may be omitted, repeated, and/or performed in a different order among different embodiments.

In Step 800, a FIB entry optimizer obtains a change to a priority of an entry of a control plane FIB of a network device. The FIB entry optimizer may be a component of the network device as illustrated in FIG. 2.

In one or more embodiments of the invention, the change to the priority of the entry of the control plane FIB may be obtained in response to a change of the priority of the entry of the control plane FIB by the network device, e.g., a priority of an entry of the control plane FIB changes. The entry of the control plane FIB may have a structure as shown in FIG. 4B and include, at least in part, a route prefix, next-hop information, and/or a route priority.

Continuing with the discussion of FIG. 8, in Step 805, the FIB entry optimizer determines whether the entry having a changed priority is in the data plane FIB. As described with respect to FIGS. 4 and 5, each entry of the data plane FIB may be associated with an entry of the control plane FIB. If no association between the changed entry of the control plane FIB and an entry of the data plane FIB, the FIB entry optimizer may determine the entry having a changed priority is not in the data plane FIB.

If the entry having the changed priority is in the data plane FIB, the method proceeds to Step 810. If the entry having the changed priority is not in the data plane FIB, the method proceeds to Step 825.

In Step 810, the FIB entry optimizer determines whether the entry having the changed priority reduces the priority to a value less than a priority of any entry of the control plane FIB that is not in the data plane FIB.

If the entry having the changed priority reduces the priority to a value less than a priority of any entry of the control plane FIB that is not in the data plane FIB, the method proceeds to Step 815. If the entry having the changed priority does not reduce the priority to a value less than a priority of any entry of the control plane FIB that is not in the data plane FIB, the method may end after Step 810.

In Step 815, the FIB entry optimizer unloads the entry having the changed priority from the data plane FIB. The FIB entry optimizer may unload the entry having the changed priority from the data plane FIB by deleting the entry having the changed priority from the data plane FIB.

In Step 820, the FIB entry optimizer loads an entry of the control plane FIB having the highest priority that is not in the data plane FIB into the data plane FIB. The FIB entry optimizer may load the entry of the control plane FIB having the highest priority that is not in the data plane FIB into the data plane FIB by generating an entry of the data plane FIB having a route prefix and next-hop information derived from the entry of the control plane FIB having the highest priority that is not in the data plane FIB. The generated entry of the data plane FIB may have a structure as illustrated in FIG. 5B. The method may end after Step 820.

As noted in Step 805, the method may proceed to Step 825 if the entry having the changed priority is not in the data plane FIB. In Step 825, the FIB entry optimizer determines an entry of the control plane FIB having a lowest priority.

In Step 830, the FIB entry optimizer determines whether the priority of the entry having a changed priority is greater than the priority of the entry of the data plane FIB having the lowest priority determined in Step 825.

If the priority of the entry having a changed priority is greater than the priority of the entry of the data plane FIB having the lowest priority, the method proceeds to Step 835. If the priority of the entry having a changed priority is equal to or less than the priority of the entry of the data plane FIB having the lowest priority, the method may end after Step 830.

In Step 835, the FIB entry optimizer unloads the entry of the data plane FIB having the lowest priority. The FIB entry optimizer may unload the entry of the data plane FIB having the lowest priority by deleting the entry having the lowest priority from the data plane FIB.

In Step 840, the FIB entry optimizer loads the entry having the changed priority into the data plane FIB. The FIB entry optimizer may load the entry having the changed priority into the data plane FIB by generating an entry of the data plane FIB having a route prefix and next-hop information derived from the entry having the changed priority. The generated entry of the data plane FIB may have a structure as illustrated in FIG. 5. The method may end after Step 840.

The process of programming a data plane FIB by the method shown in FIG. 8 is further described using an explanatory example. The following example is for explanatory purposes and is not intended to limit the scope of the technology.

EXAMPLE 4

A network device may include a data plane FIB including a first entry having a first route prefix and a priority of 5, a second entry having a second route prefix and a priority of 7, and a third entry having a third route prefix and a priority of 3.

The network device may include a control plane FIB including a first entry having a first route prefix and a priority of 5, a second entry having a second route prefix and a priority of 7, and a third entry having a third route prefix and a priority of 3, and a fourth entry having a fourth route prefix having a priority of 2.

The network device may obtain a change to a priority of an entry, including the first route prefix and a priority of 5 of a control plane FIB of the network device, which changes the priority of the entry to 4.

In response to obtaining the change to the priority of the entry, the FIB entry optimizer may determine that the entry having the changed priority in the control plane FIB is in the data plane FIB because the first entry of the data plane FIB has the first route prefix.

In response to determining that the entry having the changed priority is in the data plane FIB, the FIB entry optimizer determines the change to the priority, e.g., from 5 to 1, reduces the priority to a value less than the value of the priority of the fourth entry of the control plane FIB, e.g., 1 is less than 2.

In response to determining the change to the priority reduced the priority of the entry to a value less than the priority of the fourth entry of the control plane FIB, the FIB entry optimizer unloads the entry having the changed priority from the data plane FIB.

In response to the entry having the changed priority being unloaded from the data plane FIB, the FIB entry optimizer loads the entry of the control plane FIB that has a priority greater than the priority of the entry having the changed priority and is not in the data plane FIB into the data plane FIB.

The network device may obtain a change to a priority of the second entry of the control plane FIB of the network device that changes the priority of the entry to 6.

In response to obtaining the change to the priority of the entry, the FIB entry optimizer may determine that the entry having the changed priority in the control plane FIB is in the data plane FIB because the second entry of the data plane FIB has the same route prefix as the second entry of the control plane FIB.

In response to determining that the entry having the changed priority is in the data plane FIB, the FIB entry optimizer determines the change to the priority, e.g., from 7 to 6, reduces the priority to a value greater than the value of the priority of any entry of the control plane FIB that is not in the data plane, e.g., 6 is greater than 1.

The network device may obtain a change to a priority of the third entry of the control plane FIB of the network device that changes the priority of the entry from 1 to 2.

In response to obtaining the change to the priority of the entry, the FIB entry optimizer may determine that the entry having the changed priority in the control plane FIB is not in the data plane FIB.

In response to determining that the entry having the changed priority is not in the data plane FIB, the FIB entry optimizer determines an entry of the data plane FIB having the lowest priority.

In response to determining that the entry of the data plane FIB having the lowest priority, the FIB entry optimizer determines the change to the priority of the entry of the control plane FIB did not increase the priority of the entry of the control plane FIB to a value greater than the lowest priority.

The network device may obtain a change to a priority of the third entry of the control plane FIB of the network device that changes the priority of the entry from 2 to 10.

In response to obtaining the change to the priority of the entry, the FIB entry optimizer may determine that the entry having the changed priority in the control plane FIB is not in the data plane FIB.

In response to determining that the entry having the changed priority is not in the data plane FIB, the FIB entry optimizer determines an entry of the data plane FIB having the lowest priority.

In response to determining that the entry of the data plane FIB having the lowest priority, the FIB entry optimizer determines the change to the priority of the entry of the control plane FIB increased the priority of the entry of the control plane FIB to a value greater than the lowest priority.

In response to determining that the change to the priority of the entry of the control plane FIB increased the priority of the entry of the control plane FIB to a value greater than the lowest priority, the FIB entry optimizer unloads the entry of the data plane FIB because the priority of the first entry of the data plane FIB is the lowest priority, e.g., a priority of 4.

In response to unloading the first entry from the data plane FIB, the FIB entry optimizer loads the entry having the changed priority into the data plane FIB.

Thus, the methods shown in FIGS. 6-8 and further explained by explanatory examples 1-4 may be used to program a data plane FIB of a network device in accordance with various embodiments of the invention.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method of programming a data plane forwarding information base (FIB), comprising:
    obtaining, by a FIB entry optimizer executing on circuitry of a network processor, a to-be-unloaded entry, wherein the to-be-unloaded entry is a control plane FIB entry that has been removed from a control plane FIB;
    making a first determination, by the FIB entry optimizer, that a data plane FIB includes a matching entry that matches the to-be-unloaded entry;
    making a second determination, by the FIB entry optimizer, that the data plane FIB is full;
    in response to the first determination and second determination:
        obtaining, by the FIB entry optimizer, an identified control plane FIB entry of the control plane FIB that does not have a corresponding data plane FIB entry and has the highest priority among a set of control plane FIB entries that do not have corresponding data plane FIB entries;
        unloading, by the FIB entry optimizer, the matching entry from the data plane FIB; and
        loading, by the FIB entry optimizer, the identified control plane FIB entry into the data plane FIB.

2. The method of claim 1, wherein there are at least two entries in the control plane FIB having the highest priority.

3. The method of claim 1, further comprising:
    making a third determination, by the FIB entry optimizer, that a second to-be-unloaded entry is in the data plane FIB;
    making a fourth determination, by the FIB entry optimizer, that the data plane FIB is not full;
    unloading, by the FIB entry optimizer, the second to-be-unloaded entry from the data plane FIB.

4. The method of claim 1, further comprising:
    making a third determination, by the FIB entry optimizer, that a second to-be-unloaded entry is not in the data plane FIB;
    making a fourth determination, by the FIB entry optimizer, that the second to-be-unloaded entry is not to be unloaded from the data plane FIB.

5. The method of claim 1, wherein the to-be-unloaded entry comprises a route prefix, a next hop information, and a priority.

6. A method of programming a data plane forwarding information base (FIB), comprising:

obtaining, by a FIB entry optimizer in a control plane executing on circuitry of a network processor, a change to a priority of an entry of a control plane FIB;

making a first determination, by the FIB entry optimizer, that the entry of the control plane FIB is in the data plane FIB;

identifying, by the FIB entry optimizer, a highest priority of any entry of the control plane FIB that is not in the data plane FIB;

making a second determination, by the FIB entry optimizer, that the change to the priority of the entry of the control plane FIB changed the priority to a value lower than the highest priority;

unloading, by the FIB entry optimizer, the entry of the control plane FIB from the data plane FIB; and loading, by the FIB entry optimizer, the entry of the control plane FIB having the highest priority of any entry of the control plane FIB that is not in the data plane FIB.

7. The method of claim 6, further comprising:

obtaining, by the FIB entry optimizer in a control plane, a second change to a priority of a second entry of the control plane FIB;

making a third determination, by the FIB entry optimizer, that the second entry of the control plane FIB is in the data plane FIB;

making a fourth determination, by the FIB entry optimizer, that the second change to the priority of the second entry of the control plane FIB changes the priority to a value higher than the highest priority; and making a fifth determination, by the FIB entry optimizer, that the second entry of the control plane FIB is not to be unloaded from the data plane FIB.

8. The method of claim 6, further comprising:

obtaining, by the FIB entry optimizer in a control plane, a second change to a priority of a second entry of the control plane FIB;

making a third determination, by the FIB entry optimizer, that the second entry of the control plane FIB is not in the data plane FIB;

identifying, by the FIB entry optimizer, a lowest priority of any entry of the data plane FIB;

making a fourth determination, by the FIB entry optimizer, that second change to the priority of the second entry of the control plane FIB changes the priority of the second entry of the control plane FIB to be less than the lowest priority; and making a fifth determination, by the FIB entry optimizer, that the second entry of the control plane FIB is not to be unloaded from the data plane FIB based on the fourth determination.

9. The method of claim 6, further comprising:

obtaining, by the FIB entry optimizer in a control plane, a second change to a priority of a second entry of the control plane FIB;

making a third determination, by the FIB entry optimizer, that the second entry of the control plane FIB is not in the data plane FIB;

identifying, by the FIB entry optimizer, a lowest priority of any entry of the data plane FIB;

making a fourth determination, by the FIB entry optimizer, that second change to the priority of the second entry of the control plane FIB changes the priority of the second entry of the control plane FIB to be greater than the lowest priority;

unloading, by the FIB entry optimizer, an entry of the data plane FIB having the lowest priority; and loading, by the FIB entry optimizer, the second entry of the control plane FIB into the data plane FIB.

10. A non-transitory computer readable medium (CRM) comprising computer readable program code, which when executed by a computer processor, enables the computer processor to:

obtaining, by a FIB entry optimizer executing on circuitry of a network processor, a to-be-unloaded entry, wherein the to-be-unloaded entry is a control plane FIB entry that has been removed from a control plane FIB;

making a first determination, by the FIB entry optimizer, that a data plane FIB includes a matching entry that matches the to-be-unloaded entry;

making a second determination, by the FIB entry optimizer, that the data plane FIB is full;

in response to the first determination and second determination:

obtaining, by the FIB entry optimizer, an identified control plane FIB entry of the control plane FIB that does not have a corresponding data plane FIB entry and has the highest priority among a set of control plane FIB entries that do not have corresponding data plane FIB entries;

unloading, by the FIB entry optimizer, the matching entry from the data plane FIB; and loading, by the FIB entry optimizer, the identified control plane FIB entry into the data plane FIB.

11. The non-transitory CRM of claim 10, wherein there are at least two entries in the control plane FIB having the highest priority.

12. The non-transitory CRM of claim 10, further comprising computer readable program code, which when executed by the computer processor, enables the computer processor to:

make a third determination, by the FIB entry optimizer, that a second to-be-unloaded entry is in the data plane FIB;

make a fourth determination, by the FIB entry optimizer, that the data plane FIB is not full;

unload, by the FIB entry optimizer, the second to-be-unloaded entry from the data plane FIB.

13. The non-transitory CRM of claim 10, further comprising computer readable program code, which when executed by the computer processor, enables the computer processor to:

make a third determination, by the FIB entry optimizer, that a second to-be-unloaded entry is not in the data plane FIB;

make a fourth determination, by the FIB entry optimizer, that the second to-be-unloaded entry is not to be unloaded from the data plane FIB.

14. The non-transitory CRM of claim 10, wherein the to-be-unloaded entry comprises a route prefix, a next hop information, and a priority.

15. A network device, comprising:

a processor;

a memory;

a control plane forwarding information base (FIB);

a data plane FIB; and a FIB entry optimizer operatively connected to the control plane FIB and the data plane FIB, and programmed to:

obtain, by a FIB entry optimizer executing on circuitry of a network processor, a to-be-unloaded entry, wherein the to-be-unloaded entry is a control plane FIB entry that has been removed from a control plane FIB;

make a first determination, by the FIB entry optimizer, that a data plane FIB includes a matching entry that matches the to-be-unloaded entry;
make a second determination, by the FIB entry optimizer, that the data plane FIB is full;
in response to the first determination and second determination:
obtain, by the FIB entry optimizer, an identified control plane FIB entry of the control plane FIB that does not have a corresponding data plane FIB entry and has the highest priority among a set of control plane FIB entries that do not have corresponding data plane FIB entries;
unload, by the FIB entry optimizer, the matching entry from the data plane FIB; and
load, by the FIB entry optimizer, the identified control plane FIB entry into the data plane FIB.

16. A non-transitory computer readable medium (CRM) comprising computer readable program code, which when executed by a computer processor, enables the computer processor to:
obtain, by a FIB entry optimizer in a control plane executing on circuitry of a network processor, a change to a priority of an entry of a control plane FIB;
make a first determination, by the FIB entry optimizer, that the entry of the control plane FIB is in the data plane FIB;
identify, by the FIB entry optimizer, a highest priority of any entry of the control plane FIB that is not in the data plane FIB;
make a second determination, by the FIB entry optimizer, that the change to the priority of the entry of the control plane FIB changed the priority to a value lower than the highest priority;
unload, by the FIB entry optimizer, the entry of the control plane FIB from the data plane FIB; and
load, by the FIB entry optimizer, the entry of the control plane FIB having the highest priority of any entry of the control plane FIB that is not in the data plane FIB.

17. The non-transitory CRM of claim 16, further comprising computer readable program code, which when executed by the computer processor, enables the computer processor to:
obtain, by the FIB entry optimizer in a control plane, a second change to a priority of a second entry of the control plane FIB;
make a third determination, by the FIB entry optimizer, that the second entry of the control plane FIB is in the data plane FIB;
make a fourth determination, by the FIB entry optimizer, that the second change to the priority of the second entry of the control plane FIB changes the priority to a value higher than the highest priority; and
make a fifth determination, by the FIB entry optimizer, that the second entry of the control plane FIB is not to be unloaded from the data plane FIB.

18. The non-transitory CRM of claim 16, further comprising computer readable program code, which when executed by the computer processor, enables the computer processor to:
obtain, by the FIB entry optimizer in a control plane, a second change to a priority of a second entry of the control plane FIB;
make a third determination, by the FIB entry optimizer, that the second entry of the control plane FIB is not in the data plane FIB;
identify, by the FIB entry optimizer, a lowest priority of any entry of the data plane FIB;
make a fourth determination, by the FIB entry optimizer, that second change to the priority of the second entry of the control plane FIB changes the priority of the second entry of the control plane FIB to be less than the lowest priority; and
make a fifth determination, by the FIB entry optimizer, that the second entry of the control plane FIB is not to be unloaded from the data plane FIB based on the fourth determination.

19. The non-transitory CRM of claim 16, further comprising computer readable program code, which when executed by the computer processor, enables the computer processor to:
obtain, by the FIB entry optimizer in a control plane, a second change to a priority of a second entry of the control plane FIB;
make a third determination, by the FIB entry optimizer, that the second entry of the control plane FIB is not in the data plane FIB;
identify, by the FIB entry optimizer, a lowest priority of any entry of the data plane FIB;
make a fourth determination, by the FIB entry optimizer, that second change to the priority of the second entry of the control plane FIB changes the priority of the second entry of the control plane FIB to be greater than the lowest priority;
unload, by the FIB entry optimizer, an entry of the data plane FIB having the lowest priority; and
load, by the FIB entry optimizer, the second entry of the control plane FIB into the data plane FIB.

20. A network device, comprising:
a processor;
a memory;
a control plane forwarding information base (FIB);
a data plane FIB; and
a FIB entry optimizer operatively connected to the control plane FIB and the data plane FIB, and programmed to:
obtain a change to a priority of an entry of the control plane FIB;
make a first determination that the entry of the control plane FIB is in the data plane FIB;
identify a highest priority of any entry of the control plane FIB that is not in the data plane FIB;
make a second determination that the change to the priority of the entry of the control plane FIB changed the priority to a value lower than the highest priority;
unload the entry of the control plane FIB from the data plane FIB; and
load the entry of the control plane FIB having the highest priority of any entry of the control plane FIB that is not in the data plane FIB.

* * * * *